United States Patent
Murakami

(10) Patent No.: US 7,568,048 B2
(45) Date of Patent: Jul. 28, 2009

(54) METHOD, APPARATUS, AND SYSTEM FOR ASSIGNING AN IP ADDRESS ON A NETWORK

(75) Inventor: Yoshikuni Murakami, Zama (JP)

(73) Assignee: International Business Machines Corporation, Armonk, NY (US)

(*) Notice: Subject to any disclaimer, the term of this patent is extended or adjusted under 35 U.S.C. 154(b) by 1035 days.

(21) Appl. No.: 10/400,703

(22) Filed: Mar. 27, 2003

(65) Prior Publication Data

US 2004/0122974 A1 Jun. 24, 2004

(30) Foreign Application Priority Data

Mar. 27, 2002 (JP) ............... 2002-088702

(51) Int. Cl.
*G06F 15/16* (2006.01)
(52) U.S. Cl. .............. 709/245; 709/220; 709/221; 370/397; 370/398
(58) Field of Classification Search ........ 709/220–221, 709/245; 370/397–398
See application file for complete search history.

(56) References Cited

U.S. PATENT DOCUMENTS

| | | | |
|---|---|---|---|
| 5,724,510 A * | 3/1998 | Arndt et al. ........... | 709/220 |
| 5,854,901 A * | 12/1998 | Cole et al. ........... | 709/245 |
| 6,574,664 B1 * | 6/2003 | Liu et al. ........... | 709/224 |
| 6,691,170 B1 * | 2/2004 | Gitlin et al. ........... | 709/245 |
| 7,035,941 B2 * | 4/2006 | Shirai et al. ........... | 709/245 |
| 7,152,099 B1 * | 12/2006 | Arens ........... | 709/220 |
| 7,408,928 B2 * | 8/2008 | Bradd et al. ........... | 370/389 |
| 2002/0052960 A1 * | 5/2002 | Trisno et al. ........... | 709/226 |

FOREIGN PATENT DOCUMENTS

| | | |
|---|---|---|
| JP | PUPA57-57057 | 4/1982 |
| JP | PUPA4-82439 | 3/1992 |
| JP | PUPA 5-14356 | 1/1993 |
| JP | PUPA8-46622 | 2/1996 |
| JP | PUPA2003-229856 | 8/2003 |

* cited by examiner

*Primary Examiner*—Kenny S Lin
*Assistant Examiner*—Duyen Doan
(74) *Attorney, Agent, or Firm*—Kunzler & McKenzie

(57) ABSTRACT

A method, apparatus, and system are described to configure a network having multiple client and server computers. The network configuration is established in one embodiment by connecting a computer to the network, transmitting an IP address request to other computers connected through the network, receiving an IP address notification from the connected computers, setting the IP address of the requesting computer to avoid conflict with the IP addresses of the connected computers, and subsequently operating in an IP address notification mode.

20 Claims, 16 Drawing Sheets

METHOD, APPARATUS, AND SYSTEM FOR ASSIGNING AN IP ADDRESS ON A NETWORK

BACKGROUND OF THE INVENTION

1. Field of the Invention

The present invention relates to a computer network for information processing devices, and more particularly to a network configuration in which an IP address can be assigned without installing a DHCP server and without necessity of registering in advance the information processing devices connected to the network.

2. Description of Related Art

In recent years, an information processing device, such as a computer or a workstation, may be connected to various kinds of networks, including the Internet, a local area network (LAN), or a wide area network (WAN). In these networks, the software and hardware resources may be shared electronically. For example, shared software resources may include various kinds of data. Likewise, shared hardware resources may include storage devices, printers, and many other network resources. Each information processing device connected to one of these networks typically must be uniquely identified from the other information processing devices connected to the network. At present, an information processing device is typically identified using a unique Internet Protocol (IP) address assigned to each information processing device.

FIG. 15 shows a characteristic network system that uses IP addresses for interconnecting multiple information processing devices. The conventional network system employs a Bootstrap Protocol (BOOTP) on the User Datagram Protocol/Internet Protocol (UDP/IP). The illustrated information processing devices include a server computer 102 and a client computer 104, each connected to the network 100.

The depicted network 100 is further connected to another network 108, such as the Internet, using a router 106. Also, the server computer 102 and the client computer 104 are interconnected via a network interface card (NIC) 110, such as a network card or a network board that enables electronic communication through over the network 100.

The network 100 using the BOOTP as shown in FIG. 15 assigns an IP address to the client computer 104, employing a broadcast communication when starting a diskless client computer 104. The IP address is previously known to the server computer 102. After the IP address is assigned to the client computer 104, an operating system is transferred from the server computer 102 to the client computer 104 to enable the operation of the client computer 104. The detailed specifications of this BOOTP are defined in RFC951-BOOTSTRAP PROTCOL (BOOTP).

FIG. 16 is a diagram showing a typical network system in which the IP address is assigned using a Dynamic Host Configuration Protocol (DHCP) server 114. In this network system, the server computer 102 and the client computer 104 are connected to the network 100. Additionally, a DHCP server 114 is connected to the network 100. In a manner similar to that described above, the client computer 104 may acquire an IP address from the DHCP server 114. For example, the client computer 104 may make a connection with the DHCP server 114 through a broadcast communication to acquire the IP address. At the same time, the client computer 104 may also acquire a gateway address, a domain name, and a subnet mask from the DHCP server 114

A typical DHCP server 114 has a range of assignable IP addresses that are registered to the network 100. In one instance, the network 100 is managed by the DHCP server 114 in that the DHCP server 114 enables the client computer 104 to have an assigned IP address and acquire other information through the broadcast communication. For example, the DHCP server 114 may receive an IP address request from the client computer 104 with the IP address unassigned through the broadcast communication. The DHCP server 114, having received the IP address request, selects an unused IP address, and transmits the IP address to the client computer 104. The client computer 104 is in this way assigned the IP address within the network environment. The industry standards for a typical DHCP server 114 are defined in detail in RFC 2131-Dynamic Host Configuration Protocol, RFC 2132-DHCP options, and BOOTP Vendor Extensions.

As described above, using a DHCP server 114 to centrally manage the assignment of network IP addresses can be very effective. One obvious drawback, however, is the need for DHCP server. Furthermore, in a network system that includes one or more appliance servers, the IP address of the appliance server is changed when a lease period has elapsed by assigning the IP address using the DHCP server in rebooting the appliance server. Although a DHCP server function may be added to the appliance server, software for switching the DHCP server must be added during server downtime. In this way, it is often inappropriate to assign the IP address using the DHCP server function in the network for managing the appliance server.

In addition, the Pre-Boot Execution Environment (PXE) standards and an Automatic Private IP Addressing (APIPA) technique are utilized in recent years, thereby enabling the IP address to be assigned to the information processing device connected to the network. Though not the IP base, the Network Basic Input Output System (NetBIOS) for displaying a name list of information processing devices by registering the names of information processing devices in advance is well known. A similar function can be also used in the NetBIOS over Transmission Control Protocol/Internet Protocol (TCP/IP). However, the information processing device displaying the list must have the IP address already assigned, but the NetBIOS over TCP/IP can not be used to assign the IP address to the information processing device.

What is needed is a manner of assigning an IP address to an information processing device without relying on a DHCP server and further without applying an excessive load on the server for providing the application. Beneficially, such a method would not require a DHCP server and would allow the network to be easily reconfigured.

BRIEF SUMMARY OF THE INVENTION

This invention has been achieved on the concept that if the information processing device is enabled to acquire the IP address that is not overlapped with the assigned IP address from the range of available IP addresses in the network at a stage where the power of the information processing device is turned on in the network to which the information processing devices are connected, it is possible to provide a network environment for the user without causing the above-mentioned problems of the prior art.

The information processing device of the invention is set in an IP address setting mode when connected to the network. In the IP address setting mode, the information processing device broadcasts an IP address request to other computers connected to the network, and acquires the IP address assigned to other information processing device on the network over a certain period.

The information processing device making an IP address request creates an IP address table using the assigned IP addresses that are notified, in association with a state of IP addresses assigned for other information processing devices on the network. The created IP address table is employed for the information processing device in the IP address setting mode to acquire the IP address. The user may be prompted to enter the available IP address on the display. In another embodiment of the invention, the available IP address may be automatically assigned from a range of IP addresses assigned to the network and set by the information processing means.

The information processing device of the invention initiates an IP address notification mode, once the IP address is set. In the IP address notification mode, the IP address assigned in accordance with the invention is returned to the information processing device in the IP address setting mode via the network through the broadcast communication by monitoring the broadcast communication for the IP address request from the information processing device in the IP address setting mode to gain access to the network. The broadcast communication is made with a certain time delay that is set to an interval of Td or less to cause no broadcast storm.

According to this invention, there is provided an information processing device connected to a network and capable of intercommunication, comprising means for connecting the information processing device to the network, means for generating an IP address request, transmitting it via the network, and receiving an IP address notification from the information processing device with an IP address assigned, means for generating the IP address notification and transmitting it via the network, and means for setting the IP address using the received IP address notification, wherein the means for generating the IP address notification and transmitting it is initiated after setting the IP address.

The information processing device according to the invention may involve the setting means comprising means for acquiring the assigned IP address in the network from the IP address notification, and means for creating an IP address table from the assigned IP address acquired. Also, the information processing device according to the invention may further comprise storage means for storing the previously assigned IP address, and means for comparing the previously assigned IP address with the assigned IP address registered in the IP address table, and resetting the IP address to the previously assigned IP address, if there is no duplication of the IP address.

According to the invention, there is provided a network configuration method for interconnecting the information processing devices, comprising a step of transmitting an IP address request through the network, a step of receiving an IP address notification from an information processing device with an IP address assigned, a step of setting the IP address that can be assigned using the received IP address, and a step of changing the information processing device having transmitted the IP address request to an operation mode of generating the IP address notification and transmitting it via the network after the setting step.

This invention provides a computer readable recording medium storing a program that implements a network configuration method for interconnecting the information processing devices, the program comprising a step of transmitting an IP address request through the network, a step of receiving an IP address notification from an information processing device with an IP address assigned, a step of setting the IP address that can be assigned using the received IP address notification, and a step of changing the information processing device having transmitted the IP address request to an operation mode of generating the IP address notification and transmitting it via the network after the setting step.

The recording medium according to the invention may involve the step of receiving the IP address notification comprising a step of receiving the IP address notification continually over a longer period than a time delay for the IP address notification that is set for the information processing device with the IP address assigned. The recording medium according to the invention may involve the setting step comprising a step of acquiring the assigned IP address in the network from the IP address notification, and registering it in storage means, and a step of creating an IP address table generated from the assigned IP address registered. The recording medium according to the invention may further comprise a step of reading the previously assigned IP address held in the storage means, and a step of comparing the previously assigned IP address with the assigned IP address registered in the IP address table, and resetting the IP address to the previously assigned IP address, if the previously assigned IP address is not contained in the assigned IP address. The recording medium according to the invention may further comprise a step of updating the IP address table in accordance with a change in the network configuration.

This invention provides a program that implements a network configuration method for interconnecting the information processing devices, the program comprising a step of transmitting an IP address request through the network, a step of receiving an IP address notification from an information processing device with the IP address assigned, a step of setting the IP address that can be assigned using the received IP address notification, and a step of changing the information processing device having transmitted the IP address request to an operation mode of generating an IP address notification and transmitting it via the network after the setting step.

The program according to the invention may involve the step of receiving the IP address notification comprising a step of receiving the assigned IP address that is notified with a time difference based on the IP address. Also, the program according to the invention may involve the setting step comprises a step of acquiring the assigned IP address in the network from the IP address notification, and registering it in storage means, and a step of creating an IP address table from the assigned IP address registered. Further, the program according to the invention may involve the step of generating and transmitting the IP address request comprising a step of monitoring the communication packet in the network before transmitting the IP address request. Moreover, the program according to the invention may further comprise a step of reading the previously assigned IP address held in the storage means, and a step of comparing the previously assigned IP address with the assigned IP address registered in the IP address table, and resetting the IP address to the previously assigned IP address, if the previously assigned IP address is not contained in the assigned IP address. Moreover, the program according to the invention may further comprise a step of updating the IP address table in accordance with a change in the network configuration.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Alternate embodiments of the present invention will be described below with reference to the accompanying drawings, but the invention is not limited to the embodiments as presented.

Figure 1:
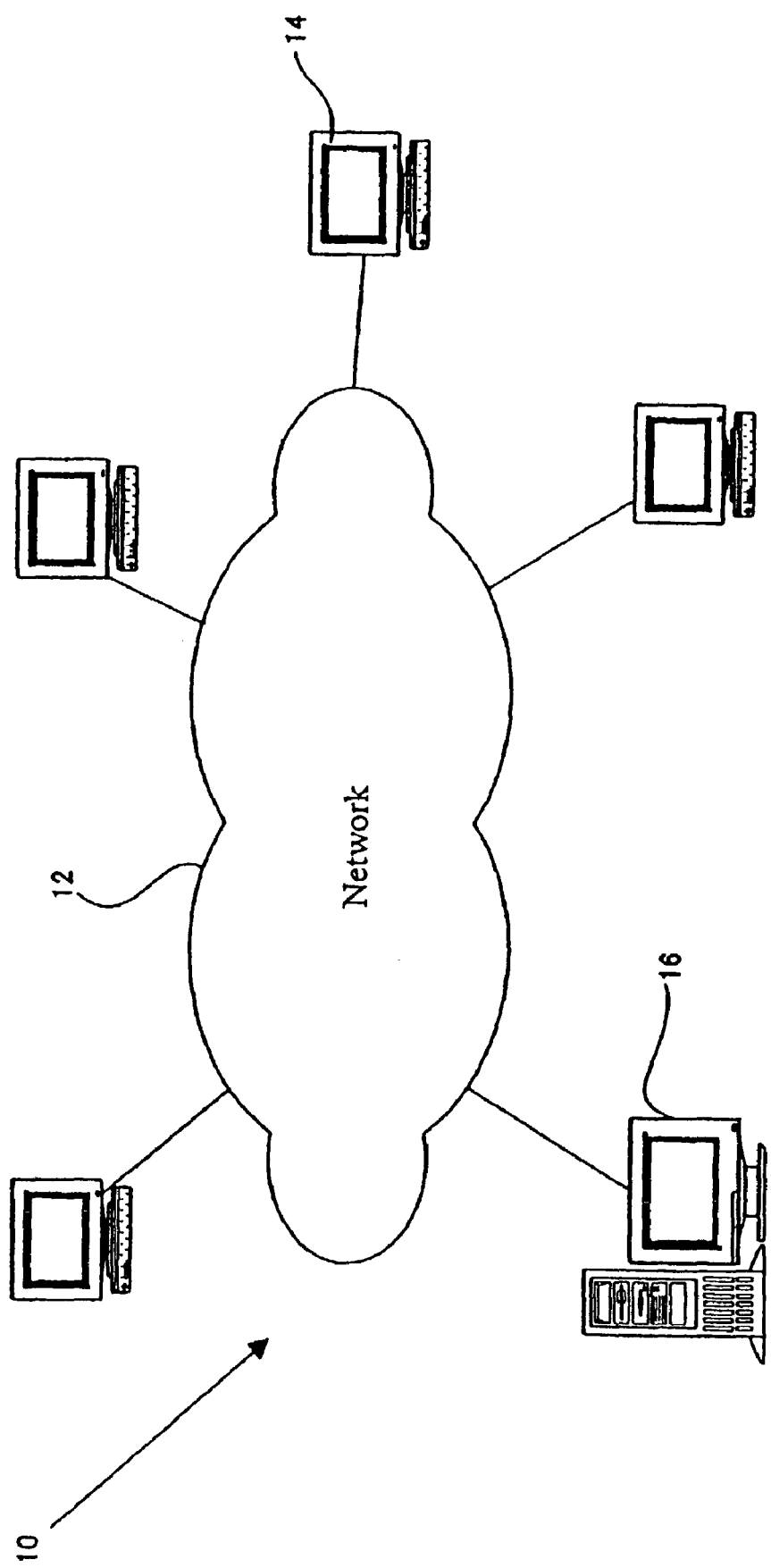
FIG. 1 is a schematic diagram showing one embodiment of a representative network system in accordance with the present invention.

FIG. 1 is a schematic diagram showing a network system 10 according to an embodiment of the present invention. The network system 10 as shown in FIG. 1 includes a first information processing device 14 connected to a network 12, and a second information processing device 16 connected to the network 12. The network environment as shown in FIG. 1 is built up as a "client-server environment," in which the first information processing device 14 is configured as a client computer, and the second information processing device 16 is configured as a server computer.

The network system 10 in the described embodiment is not specifically limited to those built up in the client server environment, but may be employed in any network. Also, the network 12 as shown in FIG. 1 may be employed in the network making the communication in accordance with any communication protocol that is known in the art, including the communication protocols such as TCP/IP and UDP. For the intercommunication in the network 12, in one embodiment an Ethernet™ using the standards such as 10BASE-10, 10BASE-100, 10BASE-1000, 10BASE-T, and 10BASE-EX may be employed. In a further embodiment, a fiber channel through the optical fiber may be employed with the light as a communication medium to provide a network capable of intercommunication.

The information processing device that can be employed in this invention in one embodiment may be personal computers, or workstations. The personal computer or workstation may include a CPU such as PENTIUM™ (Intel) and PENTINUM II to IV, or a CPU compatible therewith and operate on an operating system such as WINDOWS™ (Microsoft Corporation), WINDOWS™ NT, WINDOWS™ 2000, WINDOWS™ Me, WINDOWS™ XP (Microsoft Corporation), OS/2™ (International Business Machines Corporation), AIX™ (International Business Machines Corporation), UNIX™, and RENAX. Moreover, the information processing device of this invention may comprise a network unit such as a hub, a router and a bridge.

Also, in one embodiment of this invention, a personal computer or workstation operable on an operating system such as MacOS™ and mounting 68000 series™ CPU (Motorola, Inc.) or POWER PC™ (International Business Machines Corporation) as the CPU may be used. Moreover, the server in one embodiment may be an appliance server having application software for a specific use, and in further embodiment may be a server system having a plurality of appliance servers formed as a cluster.

Figure 2:
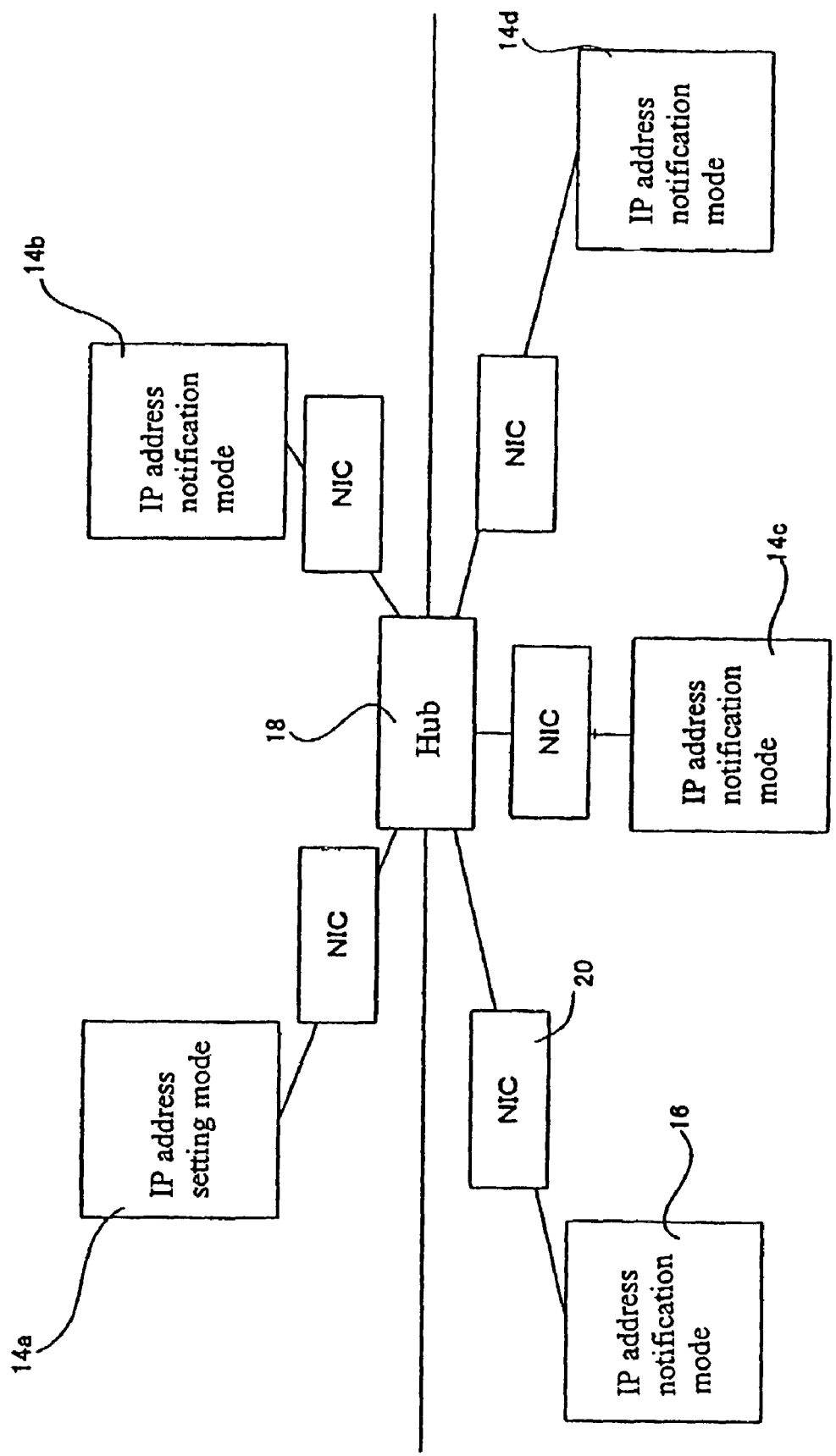
FIG. 2 is a schematic diagram showing one embodiment of a representative network configuration in accordance with the present invention.

For a matter of convenience, this invention will be described below in connection with the embodiments in which information processing means is only a computer. FIG. 2 depicts one embodiment of a block diagram showing the connection configuration of the network system 10 of FIG. 1. As shown, the computers 14a-d and the computer 16 are connected to the network 12 via an appropriate data link layer, for example, a hub 18, and an appropriate physical layer, such as a network interface card (NIC) or board 20. In one embodiment, each of the computers 14a-d is a client and the computer 16 is set up as a server. In alternate embodiments of the invention, the server may be a printer server, an application server or a storage server. In general, the functions of the server are not particularly limited.

Using FIG. 2, one embodiment of the invention will be described in which the client computer 14a makes an initial connection with the network 12. In this embodiment, the client computer 14a may operate in an IP address setting mode and acquire the IP addresses already assigned to the other client computers 14b-d and to the server computer 16. Thereafter, the client computer 14a can select an IP address that is distinct from the IP addresses of the other computers 14b-d, 16 from a list of IP addresses assigned to the network 12. After selecting and setting an appropriate IP address, the client computer 14a may operate in an IP address notification mode in which it may transmit the selected IP address in response to a further IP address request from an another computer.

Therefore, each of the computers 14a-d may operate in at least two modes: an IP address setting mode and an IP address notification mode. The IP address setting mode allows the computer 14a to select and set the IP address when the computer 14a is first connected to the network 12. The IP address notification mode allows the computer 14a to notify another computer of the IP address selected by the client computer 14a. In the embodiment as shown in FIG. 2, all of the client computers 14b-d has an assigned IP address and are therefore operating in the IP address notification mode. The client computer 14a, after initially selecting and setting an IP address in the IP address setting mode, begins to also operate in the IP address notification mode.

In one embodiment of the invention, the server computer 16 also may have fixed IP address. Under this embodiment, the server computer 16 may not need to operate in the IP address setting mode, but rather may operate exclusively in the IP address notification mode. For example, the server computer 16 may be connected to the network 12 in the IP address notification mode as shown. However, in an alternate embodiment, the server computer 16 may be configured to operate in either the IP address setting mode or the IP address notification mode, similar to the computers 14a-d.

Figure 3:
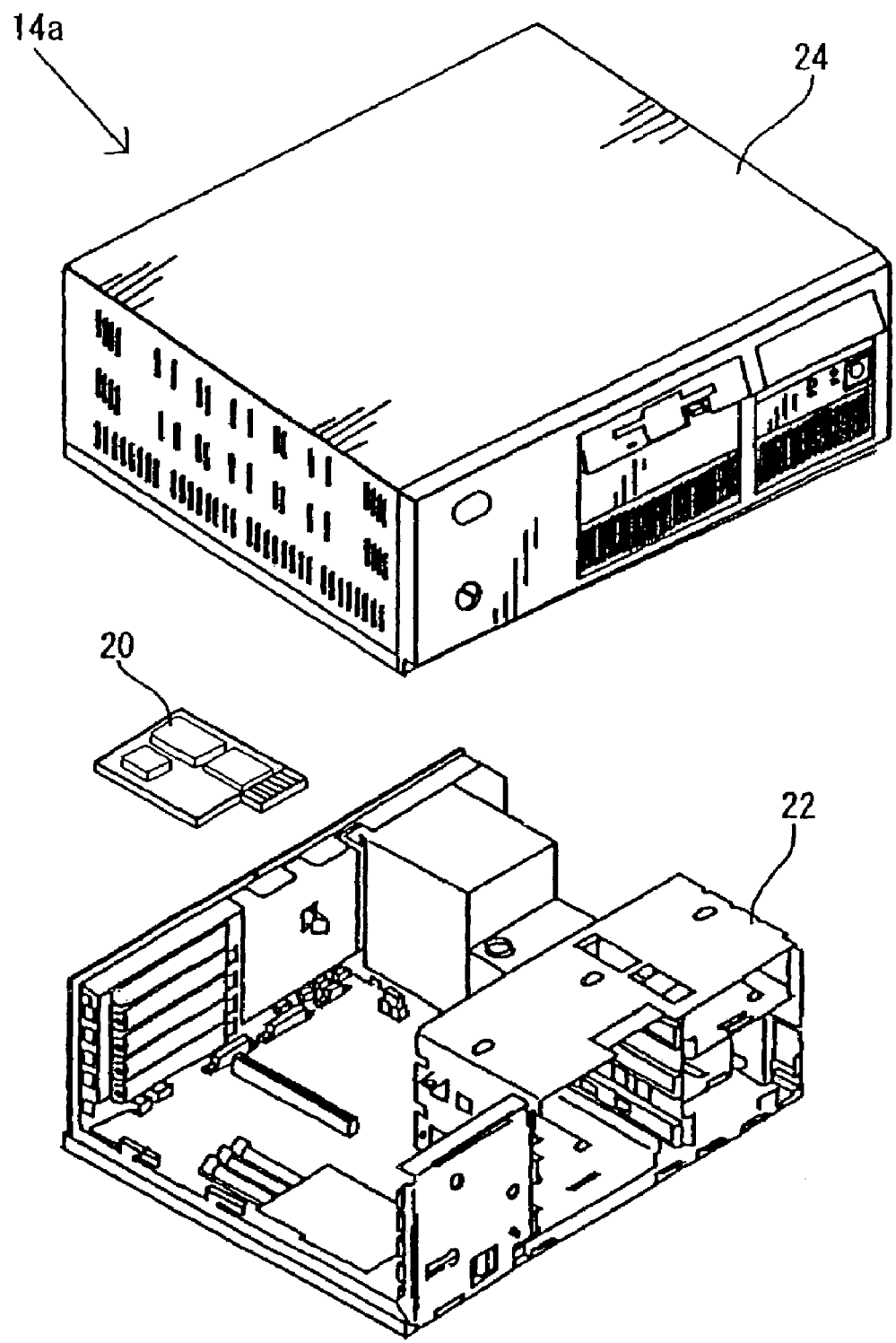
FIG. 3 is an exploded perspective view of one embodiment of a representative information processing device that can be employed in this invention.

FIG. 3 is an exploded perspective view of one embodiment of a computer 14a that may be employed in the embodiment as shown in FIG. 2. The computer 14a as shown in FIG. 3 comprises a base portion 22 and a housing 24 for accommodating the information processing elements integrally with the base portion 22. The base portion 22 is provided with a space for mounting one or more electronic storage devices, such as a floppy disk drive and a hard disk drive, a random access memory (RAM) and the central processing unit (CPU). As shown in FIG. 3, the computer 14a includes a NIC 20 as the physical layer in a network, as described in relation to FIG. 2. The NIC 20 in one embodiment allows the computer 14a to be connected to the network 12 in accordance with appropriate standards and at an appropriate data transfer rate.

The NIC 20 may be any type as known and available in the art. For example, the NIC 20 may be an Ethernet™ board, an Ethernet™ card, or a fiber channel board or card. Also, in one embodiment the NIC 20 supports a so-called Promiscuous mode in which the packet can be monitored irrespective of the IP address using the broadcast communication or raw packet in this invention.

Figure 4:
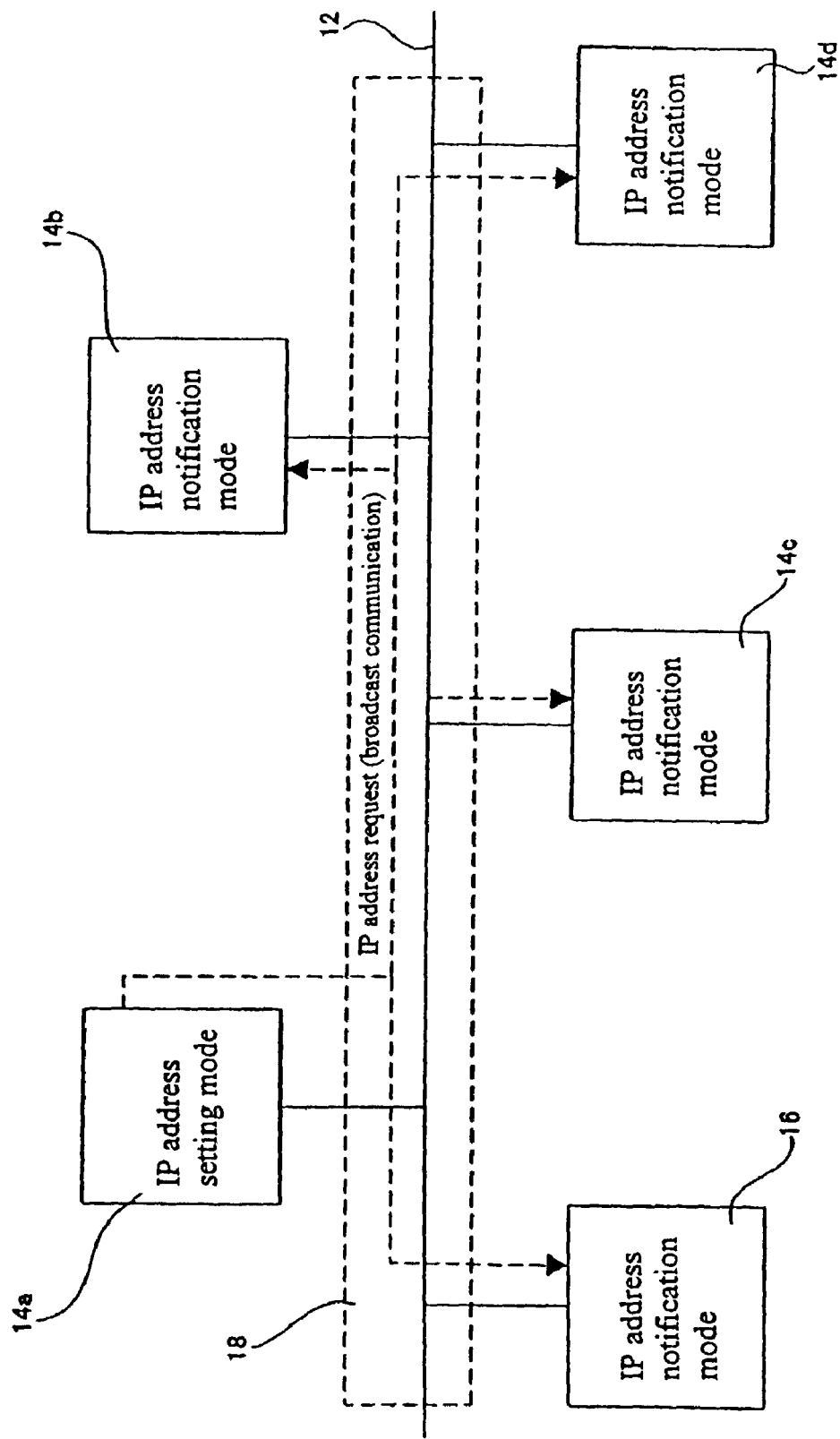
FIG. 4 is a diagram showing one embodiment of a representative process in the IP address setting mode in accordance with the present invention.

FIG. 4 is a diagram showing one embodiment of a data signal path during a process in which the client computer 14a is operating in the IP address setting mode. In this embodiment, the client computer 14a broadcasts a signal over the network 12 requesting the IP addresses assigned to the other computers 14b-d, 16 in the network 12. The IP address setting mode may be initiated when the computer 14a is initially connected to the network, for example, after the power on. The client computer 14a subsequently may wait to receive a communication packet on the network 12 to determine if the broadcast communication from the computer 14a is accepted by all the computers.

If no communication packet is detected, the computer 14a broadcasts an IP address request to the other client computers 14b-d and to the server computer 16, communicating that the client computer 14a has connected to the network 12 and is about to select and set an IP address. In this case, the computer 14a can broadcast the IP address request to the other client computers 14b-d and to the server computer 16, employing identifiable originator and destination IP addresses. In one embodiment, the computer 14a may broadcast 0.0.0.0 in the IPv4 format as the originator IP address and 255.255.255.255 as the destination IP address.

The IP address request may be broadcast by the client computer 14a as a data packet to the client computers 14b-d and the server computer 16 via the network 12. Upon receiving the IP address request data packet, the computers 14b-d, 16 may identify the broadcast communication as an IP address request data packet. The IP address request data packet will be further discussed in conjunction with FIG. 8.

Figure 5:
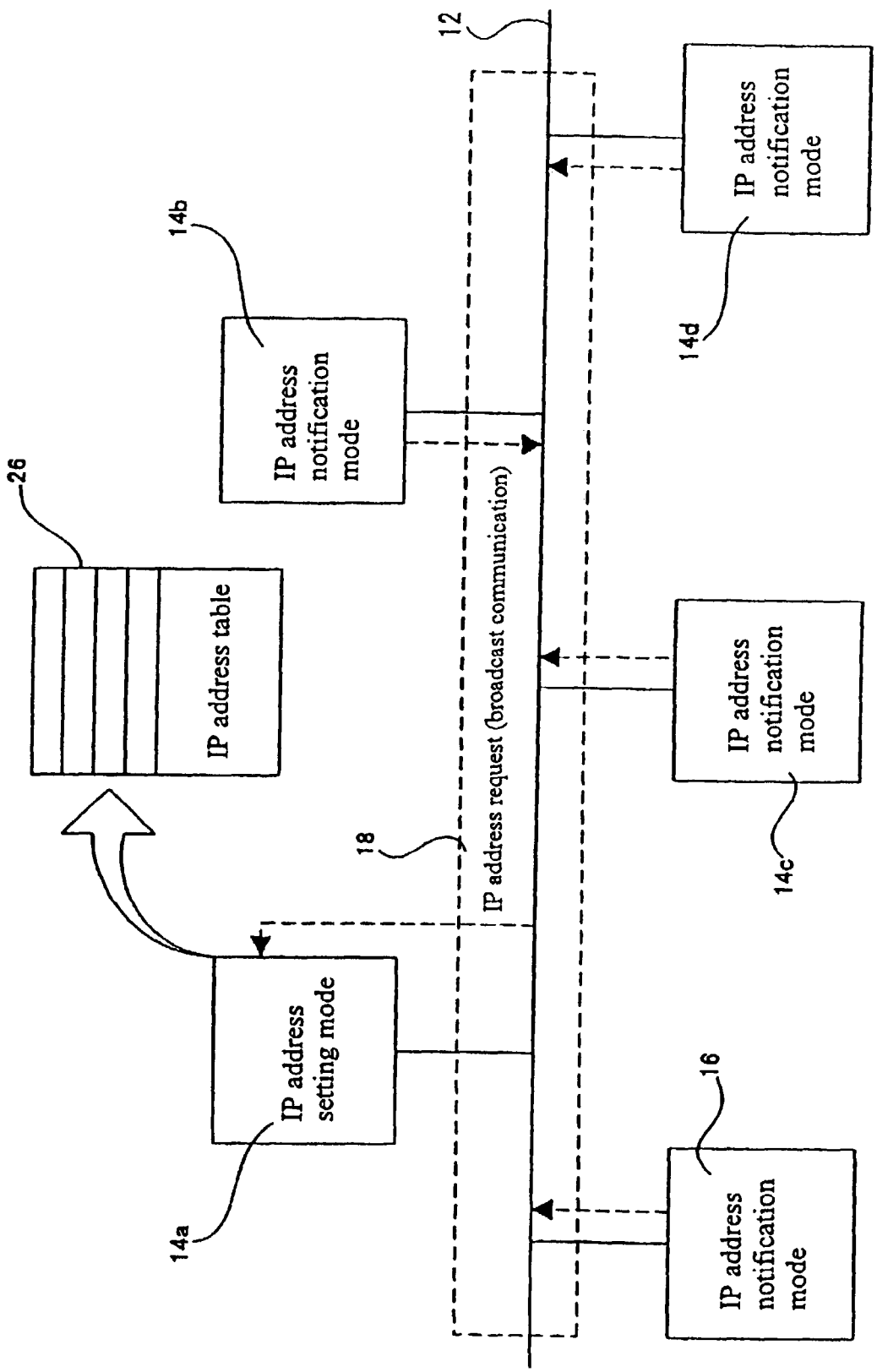
FIG. 5 is a diagram showing one embodiment of a representative process in the IP address notification mode in accordance with the present invention.

FIG. 5 is a schematic diagram showing one embodiment of one or more response data signal paths from the client computers 14b-d and the server computer 16. In one embodiment, each of the computers 14b-d, 16 transmits an IP address notification data packet to the client computer 14a using the MAC address provided in the IP address request data packet and uniquely corresponding to the NIC 20 and the client computer 14a. Each IP address notification data packet includes at least the IP address assigned to the responding client computer 14b-d or server computer 16. The IP address notification data packet will be further discussed in conjunction with FIG. 9.

Upon receiving the IP address notification data packets, the client computer 14a in one embodiment creates an IP address table 26 listing all of the currently assigned IP addresses on the network 12. In a further embodiment, the IP address table 26 may contain a computer identifier corresponding to each assigned IP address contained in the IP address notification data packets. The computer identifier identifies each computer 14b-d, 16, such as a user name, a nickname, or an identification number assigned to the computer, which is usable to identify the computer on the network 12.

Figure 6:
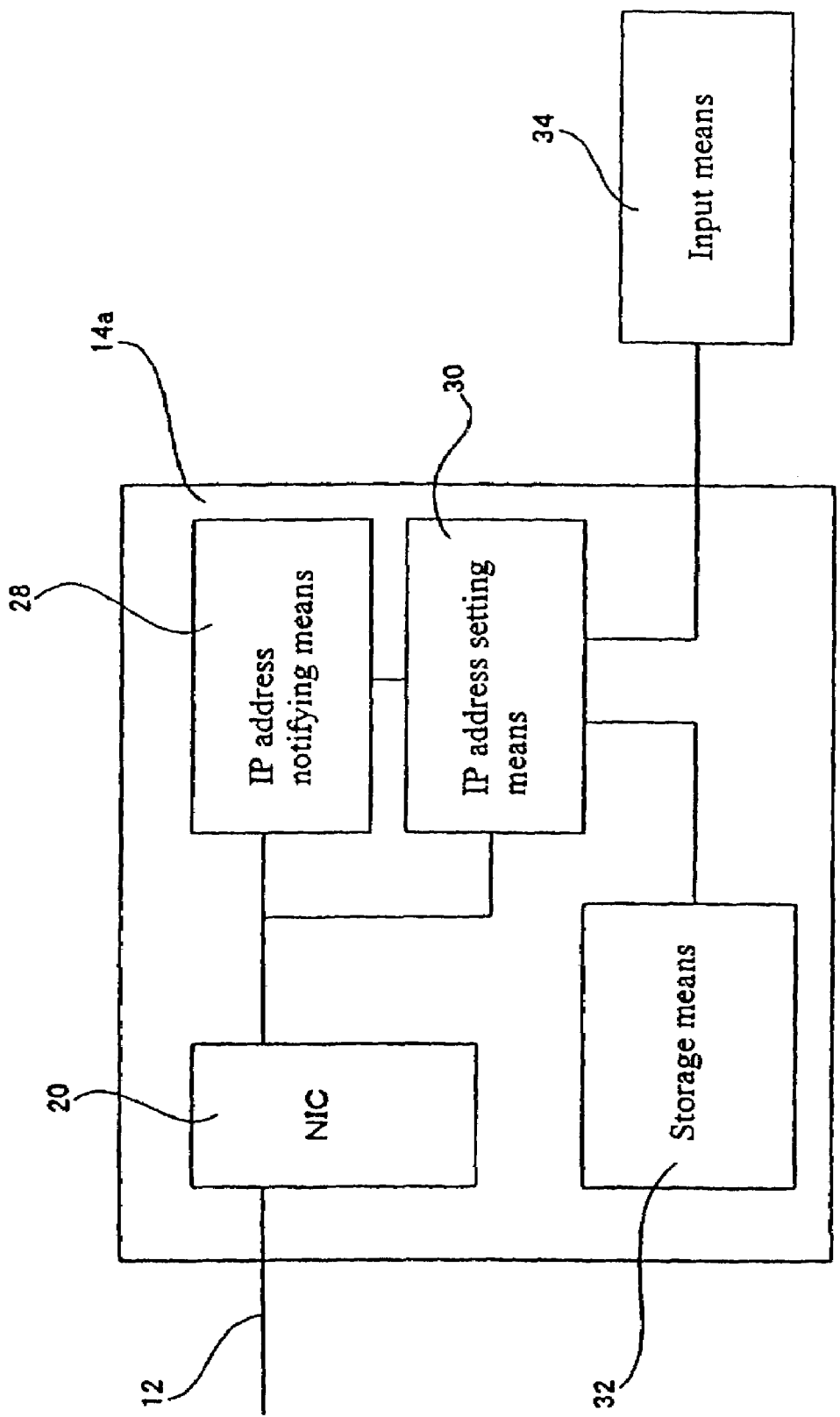
FIG. 6 is a function block diagram illustrating one embodiment of an information processing module in accordance with the present invention.

FIG. 6 is a schematic block diagram of one embodiment of the computer 14a. As shown in FIG. 6, the computer 14a includes a NIC 20, an IP address notification module 28, an IP address setting module 30, an electronic storage module 32, and an input module 34. The IP address setting module 30 may be configured to generate an IP address request data packet, as described above, to be transmitted over the network 12 via the NIC 20. The IP address notifying module 28 may be configured to receive an IP address request data packet and to generate an IP address notification data packet, also described above, to be transmitted over the network 12 via the NIC 20. The IP address notifying module 28 in one embodiment includes software that initializes the IP address notification mode after completion of the IP address setting mode.

The illustrated computer 14a initiates the IP address setting mode, when first connected to the network 12, for example, at the power on. While in the IP address setting mode, the computer 14a may receive one or more IP address notification data packets from the computers 14b-d, 16 that are operating in the IP address notification mode, for example. The IP address setting means 28 in one embodiment subsequently analyzes the IP address notification data packets received and creates an IP address list 26. The IP address list 26 may be stored in the electronic storage module 32.

In one embodiment of the invention, the client computer 14a may operate in the IP address setting mode for a specified time-out period after an IP address request data packet has been broadcast over the network 12. The time-out period is preferably sufficient to receive all the IP address notifications data packets from remaining computers 14b-d, 16 connected to the network 12. The IP address setting module 30 in one embodiment stores the assigned IP address received during the time-out period in the electronic storage module 32. In a further embodiment, the electronic storage module 32 also may hold the previously assigned IP address that was assigned to the requesting client computer 14a when the computer 14a last gained access to the network 12. The previously assigned IP address in one embodiment may be reassigned as the new IP address of the client computer 14a, unless it duplicates the assigned IP address of one of the other computers 14*b*-*d*, 16 currently connected to the network. Additionally, the IP address table 26 may be deleted or backed up with a time stamp to monitor the past log, when the computer 14*a* is powered off or otherwise disconnects from the network 12.

In a further embodiment, the IP address table 26 may be displayed on a display screen for a user to input a desired IP address using the input module 34. If the user does not want to use the computer 14*a* in the network environment 10, the computer 14*a* may be operated in stand alone by skipping the setting of the IP address.

The computer 14*a* may subsequently invoke the IP address notification mode after the IP address is set in the IP address setting mode. In the IP address notification mode, the computer 14*a* in one embodiment transmits the IP address notification data packet, including the selected IP address, upon receiving an IP address request data packet from another computer.

Figure 7:
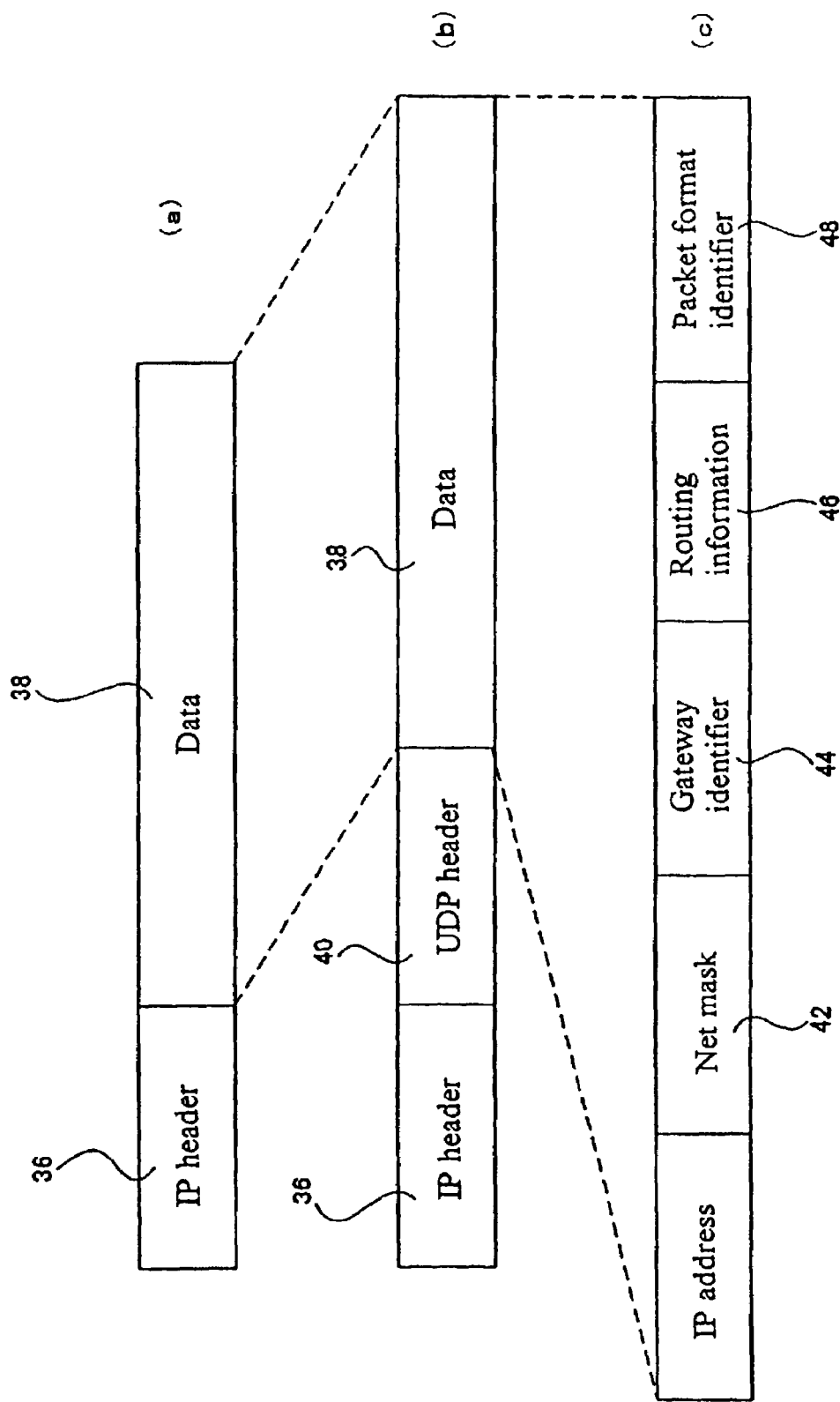
FIG. 7 is a schematic diagram showing one embodiment of the format of a representative data packet to be employed in this invention.

FIG. 7 is a schematic diagram showing one embodiment of the configuration of a data packet that may be employed for transmitting an IP address over the network 12. The structure of the illustrated data packet may include an IP header section 36 and a data section 38, as shown in FIG. 7(*a*). In an alternate embodiment where a UDP format is utilized, the data packet may additionally include a UDP header part 40, as shown in FIG. 7(*b*). The specific format of the data structure employed in this invention is not limited to particular format or transmission protocol.

The IP header section 36 as shown in FIGS. 7(*a*) and 7(*b*) in one embodiment may include the IP version information, such as IPv4, a service type, the total data length, and the protocol information. The UDP header section 40 as shown in FIG. 7(*b*) may include an originator port number, a destination port number, a data length, and a check sum. The data section 38 may include an originator IP address, a destination IP address, the net mask information 42, a gateway identifier 44, the routing information 46 such as an IP address of DNS server, and a packet format identifier 48, as shown in FIG. 7(*c*). The format of the IP address that can be used in this invention is not limited to the IPv4format, but may be IPv6 format or another appropriate format. Also, this invention is in one or more embodiments may be employed in several different types of network system 10, such as a network system 10 having the a mixed IPv4/IPv6 format, that are familiar to one skilled in the art.

Figure 8:
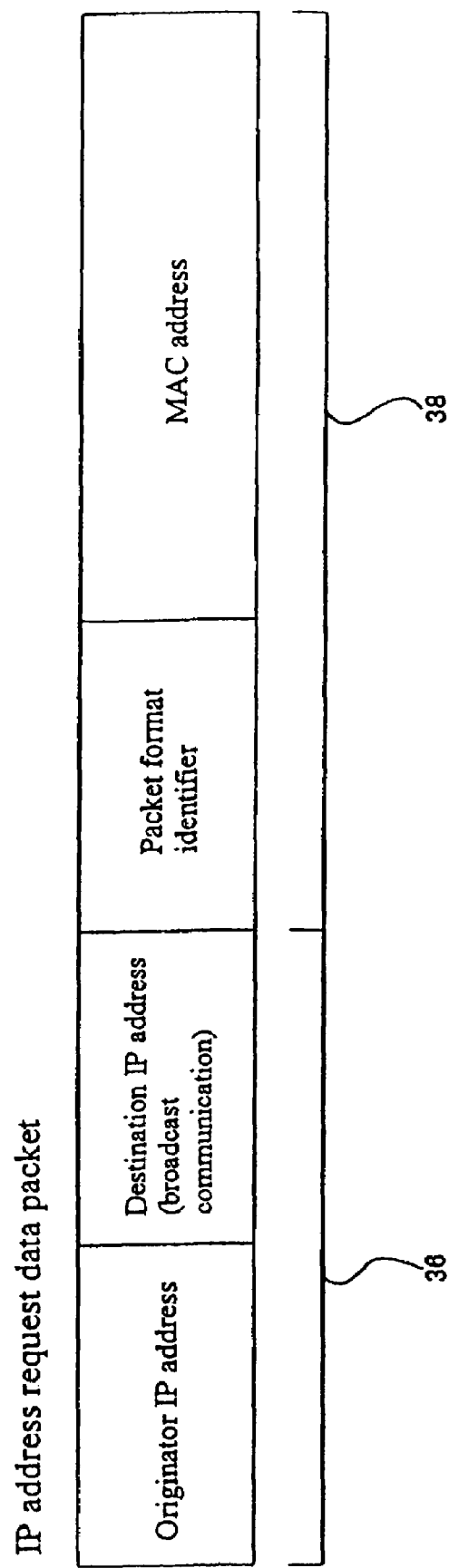
FIG. 8 is a schematic block diagram showing one embodiment of an IP address request data packet in accordance with the present invention.

FIG. 8 is a diagram showing in more detail one embodiment of the data format of an IP address request data packet that may be transmitted from the computer 14*a* in the IP address request mode, as shown in FIG. 2. In the depicted embodiment, the IP address request data packet includes an IP header section 36 and a data section 38. The IP header section 36 may include an originator IP address and a destination IP address. The data section 38 may include a packet format identifier, and a MAC address that is an intrinsic identifier attached to the NIC 20 mounted on the computer 14*a* that transmits the IP address request data packet.

In alternate embodiments, various data structure formats may be employed to represent the IP address request data packet. For example, the MAC address contained in the IP address request data packet may be employed as the identifier. Also, the IP address used as the originator IP address may be defined in advance to employ the defined IP address as the identifier. Also, the IP unset identifier may be set in the data section 38.

In the embodiment as discussed above, the originator IP address may be set to 0.0.0.0 and the destination IP address may be 255.255.255.255 in the IPv4 format. The destination IP address in one embodiment may indicate the entire network 12 to which the client computer 14*a* making the request belongs, and may take any appropriate value so long as the broadcast communication is enabled. In another embodiment of the invention, the UDP packet format may be employed in addition to the raw packet format.

The MAC address contained in the data section 38 as shown in FIG. 8 in one embodiment allows the client computer 14*a* to acquire the IP address notification data packet from each of the computers 14*b*-*d*, 16 that transmits an IP address notification data packet to the computer 14*a*.

Figure 9:
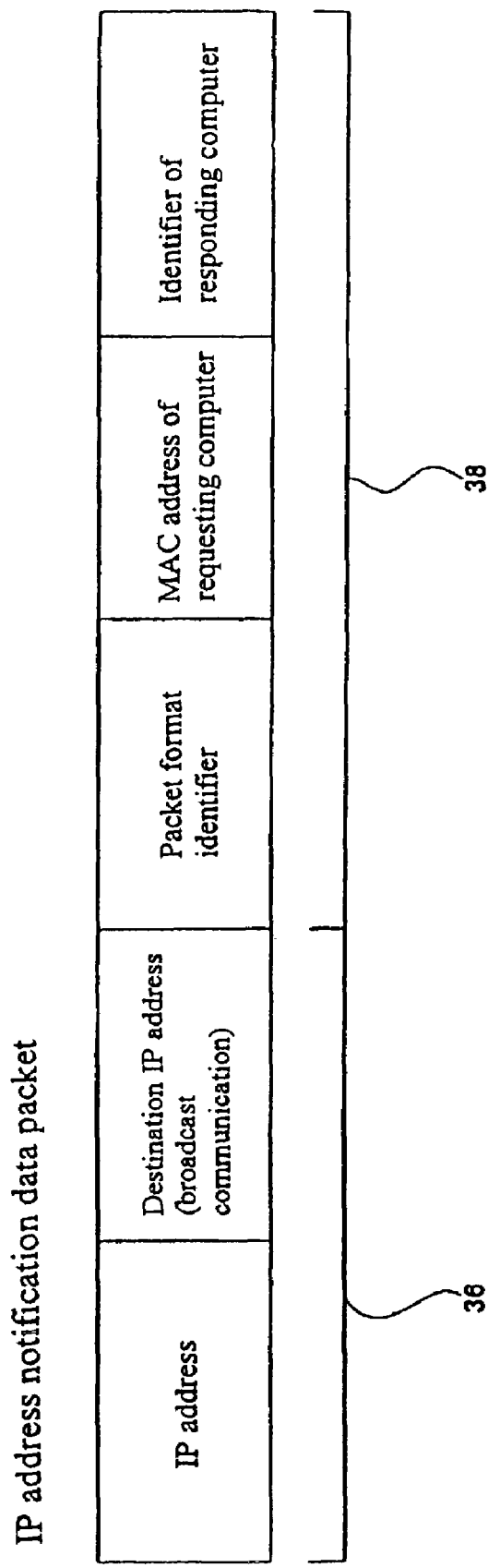
FIG. 9 is a schematic block diagram showing one embodiment of a representative IP address notification data packet in accordance with the present invention.

FIG. 9 is a diagram showing one embodiment of an IP address notification data packet that may be employed in the present invention. The illustrated IP address notification data packet includes an IP header section 36 and a data section 38. The IP header section 36 includes an assigned IP address to be notified, for example, xxx.yyy.zzz.1, and a destination IP address for broadcast communication, for example, 255.255.255.255. The depicted data section 38 includes a packet format identifier and a MAC address for designating the computer 14*a* having issued the IP address request. It also includes a computer identifier to identify the computer 14*b*-*d*, 16 responding to the IP address request from the client computer 14*a*. This computer identifier may be employed in one embodiment to make it easier to associate each computer with the IP address associated with each computer 14*b*-*d*, 16, as above described. In an alternate embodiment, however, it is unnecessary that the data section 38 comprises the computer identifier. Moreover, in a further embodiment the IP address notification data packet may include additional identifier and other information as needed.

The IP address notification data packet may be communicated over the network in the raw packet format or the UDP packet format, as above described. The client computer 14*a* in one embodiment identifies the IP address notification data packet by referring to the MAC address field contained in the IP address notification data packet. Once identified, the client computer 14*a* may acquire additional information from the IP address notification data packet, including the IP address of the responding computer 14*b*-*d*, 16.

Figure 10:
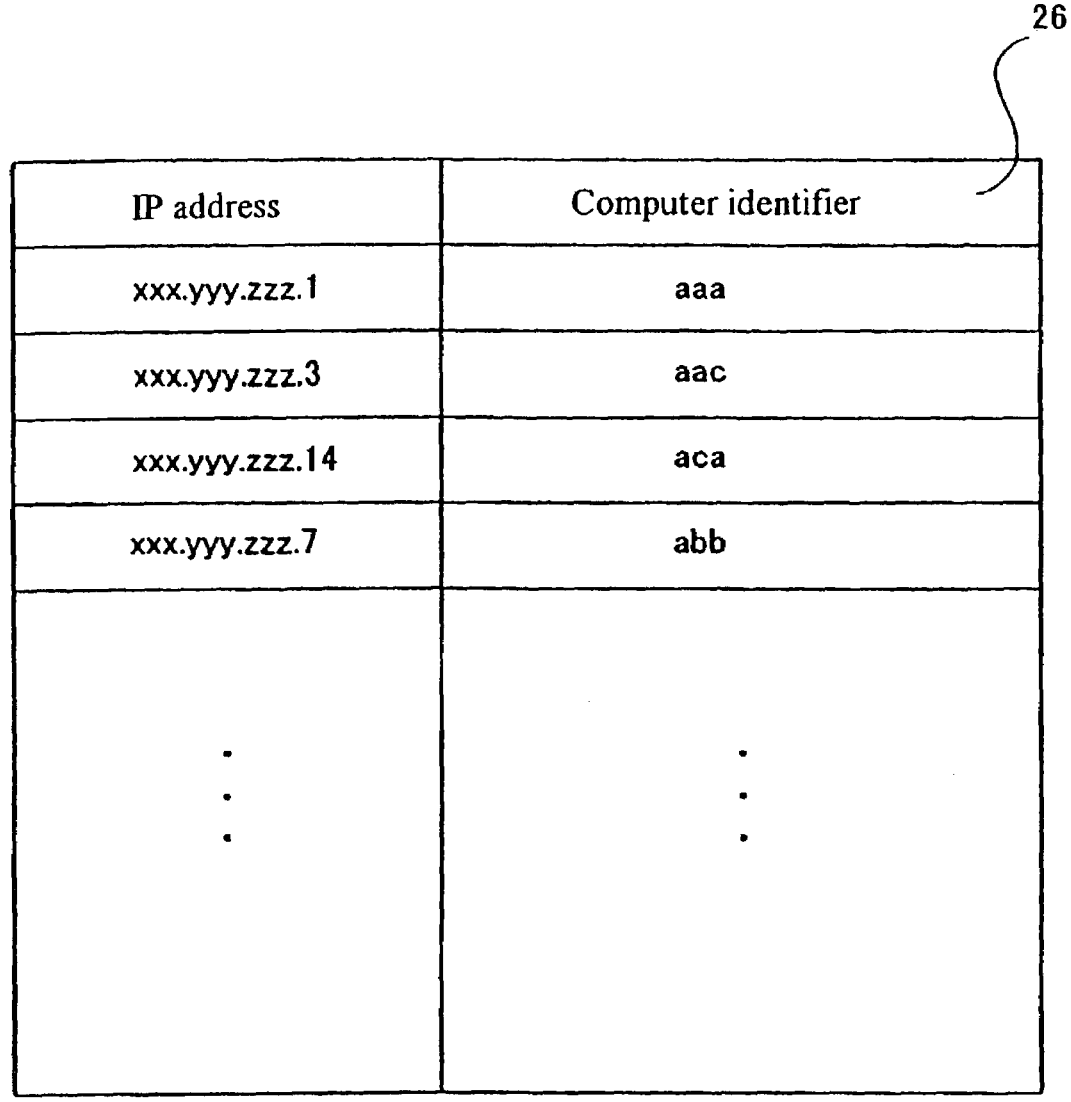
FIG. 10 is a schematic block diagram showing one embodiment of a representative IP address table in accordance with the present invention.

FIG. 10 shows an embodiment of an IP address table 26 in which the IP address assigned to the computers 14*b*-*d*, 16 within the network 12 at that time the client computer 14*a* is connected to the network. The IP address table as shown in FIG. 10 contains a collection of IP addresses already assigned within the network 12 at that time—these IP address typically win not be duplicated or assigned to multiple computers. The IP address table 26 in one embodiment is automatically created for all the computers 14*a*-*d*, 16 currently connected to the network 12.

In one embodiment of the invention, each of the computers 14*a*-*d*, 16 may create a distinct IP address table 26 that is unique to the computer 14*a*-*d*, 16 on which it is stored. In the scenario in which the client computer 14*a* is initially connected to the network 12 and selects an IP address, the computer 14*a* may broadcast the selected IP address to the remaining computers 14*b*-*d*, 16. During a power off sequence for the client computer 14*a*, the computer 14*a* may broadcast another data packet notifying the other computers 14*b*-*d*, 16 that the selected IP address may be deleted from their respective IP address tables 26 and be made available to a subsequently connected computer.

Figure 11:
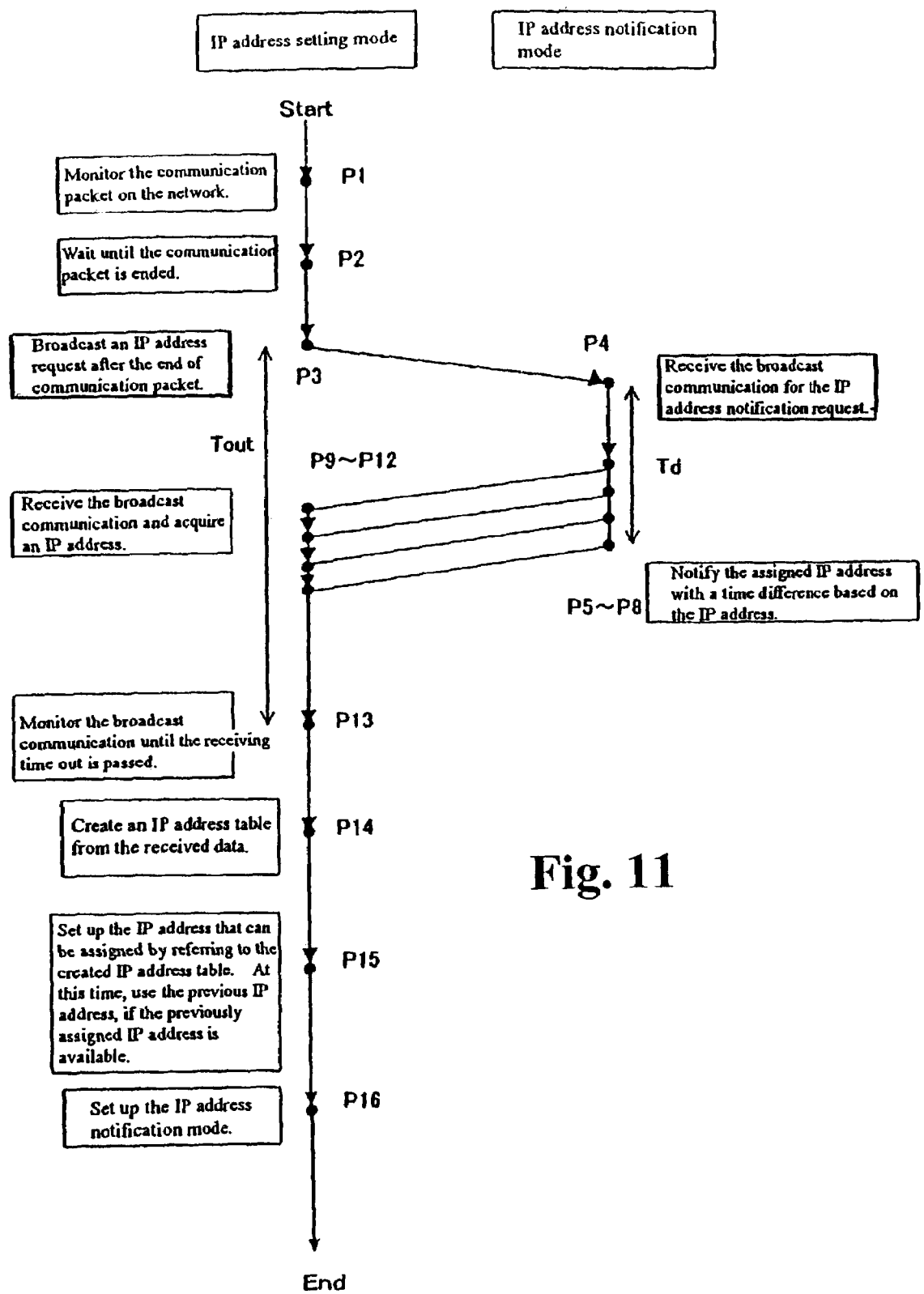
FIG. 11 is a representative process chart of the IP address transmission and reception between the information processing devices in accordance with the present invention.

FIG. 11 is a diagram showing one embodiment of the transactions between a computer in the IP address setting mode, such as the client computer 14*a* in the previous examples, and a computer in the IP address notification mode, such as the computers 14*b*-*d*, 16. As shown in FIG. 11 and previously discussed, when initially connected to a network 12, the computer 14a is started in the IP address setting mode and monitors, at point P1, the communication packet on the network 12 to check whether or not the computers 14b-d, 16 operating on the network 12 are available to receive a broadcast communication. If the computers 14b-d, 16 are not available to receive a broadcast communication then they will not receive the IP address request data packet from the client computer 14a and an IP address can not be acquired.

The computer 14a in the IP address setting mode waits, as indicated at point P2, for any current communication packet transmissions on the network 12 cease. After the computer 14a determines that all the communication packet transmissions have ceased, it transmits, at point P3, an IP address request via a broadcast communication. This IP address request broadcast over the network 12 is received, at point P4, by the computers 14b-d, 16 that are operating in the IP address notification mode.

At points P5 to P8, the computers 14b-d, 16 receive the IP address request data packet and each transmits a responsive IP address notification data packet, also via a broadcast communication. Each of the broadcast communications transmitted by computers 14b-d, 16 in one embodiment may be sent after a fixed or variable time delay, Td, associated with each of the IP addresses. In this manner, network collisions and non-conformity, such as a broadcast storm due to simultaneous occurrence of the broadcast communication, may be minimized or avoided. The time delay, Td, in one embodiment may be determined by one or more random number generation means associated with the IP addresses of the transmitting computers 14b-d, 16. However, if the time delay, Td, is longer than a time out, Tout, as will be described later, the receiving computer 14a may miss collecting the assigned IP addresses within the network. Therefore, in one embodiment of the invention, the time delay, Td , must be determined to be shorter than the time out, Tout, of the computer 14a operating in the IP address setting mode.

At points P9 to P12, the computer 14a in the IP address setting mode receives the various IP address notification data packets, including the IP addresses assigned to the other computers 14b-d, 16 connected to the network 12. The computer 14a in the IP address setting mode continues to receive the broadcast communications until a time out period expires, at point P13. In a preferred embodiment, the time out period, Tout, is sufficient to receive all of the IP address notification data packets from all of the computers 14b-d, 16 connected to the network 12.

At point P14, the computer 14a in the IP address setting mode creates an IP address table 26, as shown and discussed in FIG. 10, using the received IP address notification data packets. At point P15, the computer 14a determines one or more available IP addresses and sets the IP address of the newly connected computer 14a to one of the available IP addresses. In one embodiment, the range of available and assigned IP addresses for the network 12 may be held in advance in the computers 14a-d, 16 by the input of a user or network administrator. In an alternate embodiment, the range of IP addresses that can be assigned for the network 12 may be stored in the server computer 16 and transmitted via the IP address notification data packet to the requesting computer 14a.

In one embodiment in which the requesting computer 14a has previously connected to the network 12 and obtained a valid IP address, the computer 14a may determine whether or not the previously assigned IP address is available. In this case, if the previous IP address is not registered in the generated IP address table 26 and is available, the computer 14a may preferentially assign the previously used IP address. After assigning an IP address, the computer 14a may operate in the IP address notification mode, at point P16, in order to receive IP address requests from other computers that subsequently connect to the network 12.

Figure 12:
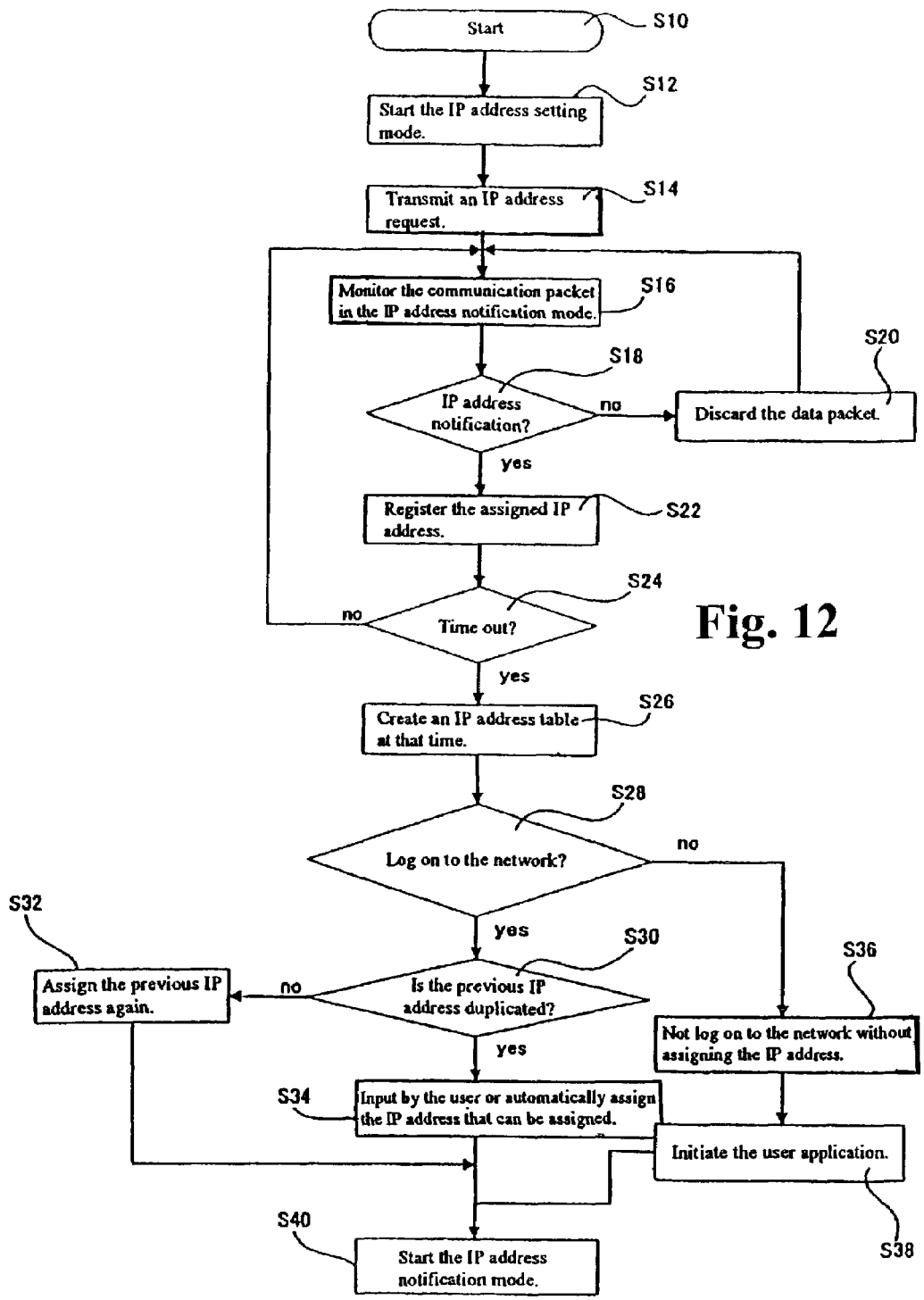
FIG. 12 is a flowchart diagram of one embodiment of an IP address request mode process in accordance with the present invention.

FIG. 12 is a flowchart showing one embodiment of a process of the IP address setting mode that may be implemented by a computer, such as the client computer 14a, connecting to the network 12. The illustrated process starts at step S10. At step S12, in connecting the computer 14a to the network 12, the IP address setting mode is initiated. At step S14, the computer 14a in the IP address setting mode transmits an IP address request in the raw packet format, in one embodiment, or the UDP packet format, in an alternate embodiment. The IP address request in a preferred embodiment is transmitted after all the current communication packets on the network 12 are completed. After broadcasting the IP address request the computer 14a monitors the network 12, at step S16, for potential IP address notification data packets from the computers in the IP address notification mode, such as the computers 14b-d, 16.

At step S18, a determination is made whether or not any received communication packets are IP address notification data packets. This determination may be based on whether the packet format identifier indicating the IP address notification data packet is contained in the received data packet. If it is determined that the communication packet is not an IP address notification data packet, the communication packet is discarded, at step S20, and the process resumes monitoring the network 12 for IP address notification data packets, at step S16.

If the received communication packet is an IP address notification data packet, the IP address notification data packet is registered, at step S22. Then, at step S24, a determination is made whether or not the time out period, Tout, set for the IP address notification response is expired. If not, the process continues to monitor the network 12, at step S16. The illustrated process assumes that at least one of the communications packets received by the requesting computer 14a within the time out period, Tout, is an IP address notification data packet.

After the time out, Tout, is expired, the receiving computer 14a uses the assigned IP addresses of the registered IP address notification data packets to create an IP address table 26, at step S26. At step S28, in one embodiment of the invention the process may determine whether or not a user wants to log on to the network 12. If so, the user is may be prompted to enter a log-on on the display screen of the computer. If the user does not want to log on to the network, a network IP address is not assigned to the computer 14a, at step S36. At step S38, the computer 14a may then be operated in a stand-alone state to initiate a user application.

If the user decides to log on to the network 12, a determination is made, at step S30, whether or not a previously assigned IP address registered in the newly created IP address table 26. If the previously assigned IP address is not registered in the newly created IP address table 26, the computer 14a may assign, at step S32, the previous IP address for the current network session. If the previously assigned IP address is registered in the IP address table 26, the computer 14a proceeds to assign an IP address either automatically or through user input, at step S34. When the IP address is input by the user at step S34, the user may be prompted to enter the IP address on the display screen of the computer 14a. In this case, the IP address table 26 and the range of IP addresses that can be assigned may be displayed for the user.

After assigning an available IP address to the computer 14a, at step S32 or S34, or entering a stand-alone configuration, at step S36, the computer 14a in one embodiment begins to operate in the IP address notification mode, at step S40.

Figure 13:
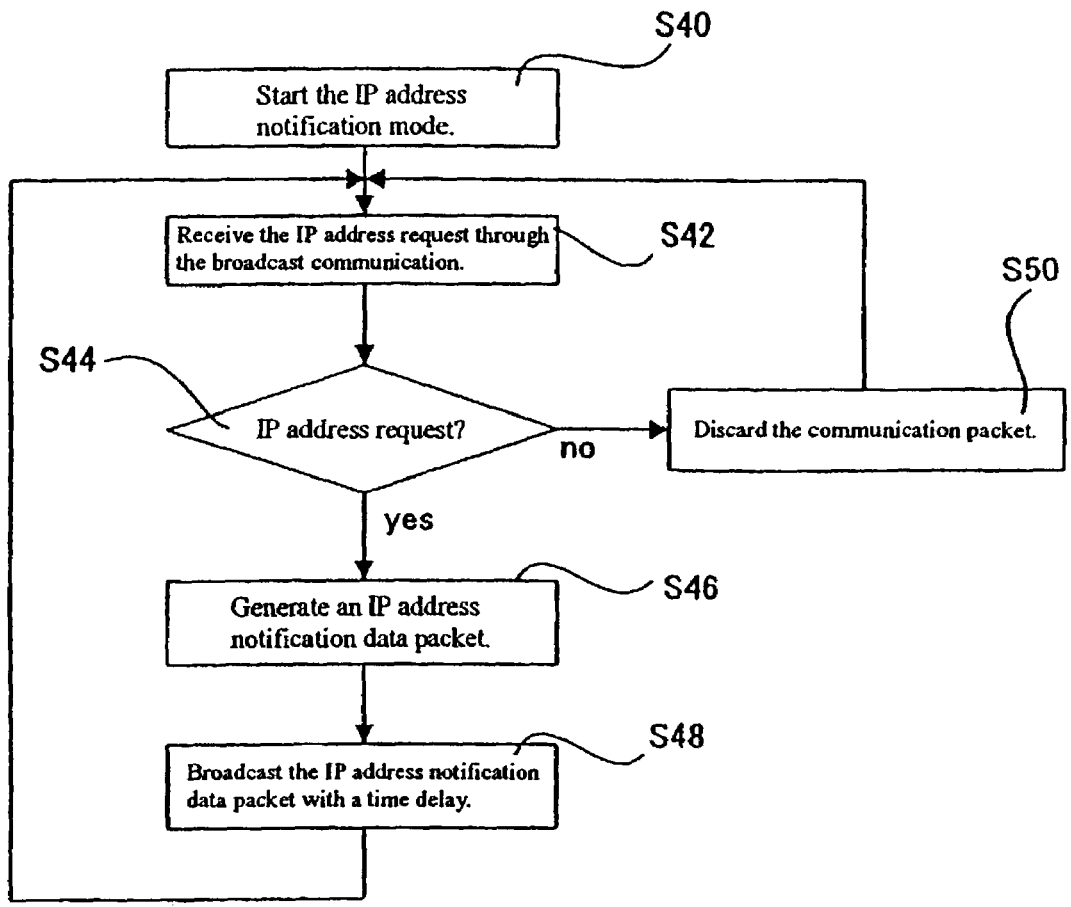
FIG. 13 is a flowchart diagram of one embodiment of an IP address notification mode process in accordance with the present invention.

FIG. 13 is a flowchart showing one embodiment of a process of the IP address notification mode that may be implemented by a computer, such as the computer 14b of the previous example. The IP address notification mode in one embodiment initiated on each computer after an IP address has been assigned for that computer through the IP address setting mode. The IP address notification mode of FIG. 13 is started at step S40. In one embodiment, when the computer 14b is operating in the IP address notification mode, the computer 14b monitors and the network 12 for potential broadcast communications containing IP address requests and receives such packets, at step S42. At step S44, a determination is made whether or not the received communication packet is an IP address request data packet.

If the communication packet is an IP address request data packet, the IP address notification data packet containing the IP address of the computer 14b and MAC address of the requesting computer 14a is generated, at step S46, and transmitted over the network 12, at step S48. In one embodiment, as described above, the IP address notification packet is transmitted with an appropriate time delay, Td, that may be determined by a random number generating method. If the IP address notification data packet is transmitted using a broadcast communication over the network 12, the IP address tables 26 stored by each of the computers 14b-d, 16 may be updated at this time.

After transmitting the IP address data packet, the process of the IP address notification mode returns to step S42 to monitor the network 12 for additional IP address requests. If it is determined at step S44 that the received communication packet is not an IP address request data packet, the process proceeds to discard the communication packet, at step S50, and returns to step S42 to monitor the network 12 for additional IP address requests.

By implementing the processes shown in FIGS. 12 and 13, each computer may initially operate in the IP address setting mode in order to assign an IP address and then operate in the IP address notification mode to facilitate the assignment of IP addresses to subsequently connected computers. In this manner, the IP address of each computer can be appropriately assigned without requiring an additional server, such as DHCP server. Thus, a LAN configuration may be formed at very low cost and with the flexibility to adjust with a change in the division constitution of the company, reducing the network cost and decreasing the workload of the network administrator. Moreover, by maintaining an IP address table 26, the network resources can be shared among multiple computers without excessive load.

Figure 14:
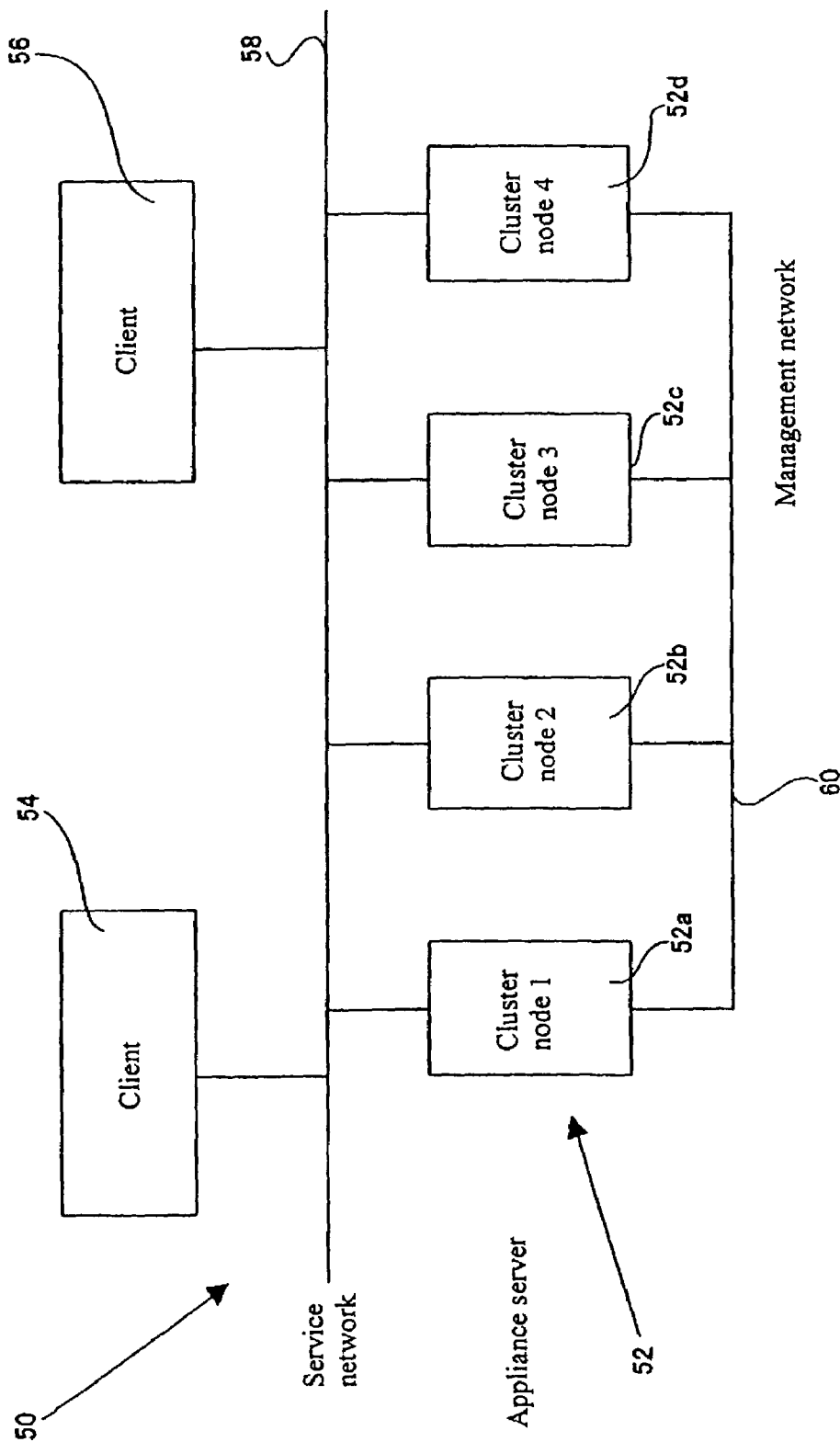
FIG. 14 is a schematic block diagram showing an alternate embodiment of a network system in accordance with the present invention.
Figure 15:
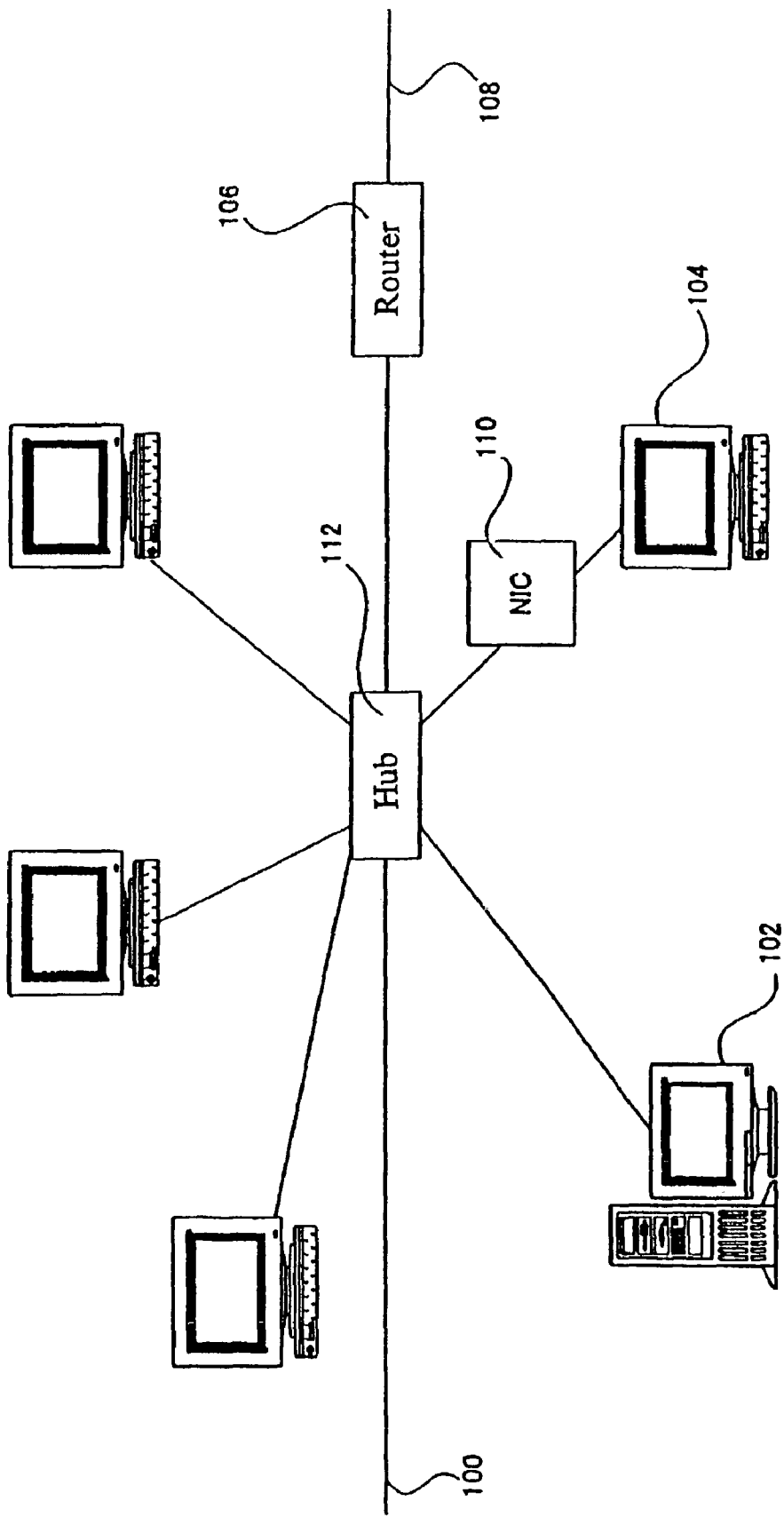
FIG. 15 is a schematic block diagram showing a typical network system using a conventional Bootstrap Protocol.
Figure 16:
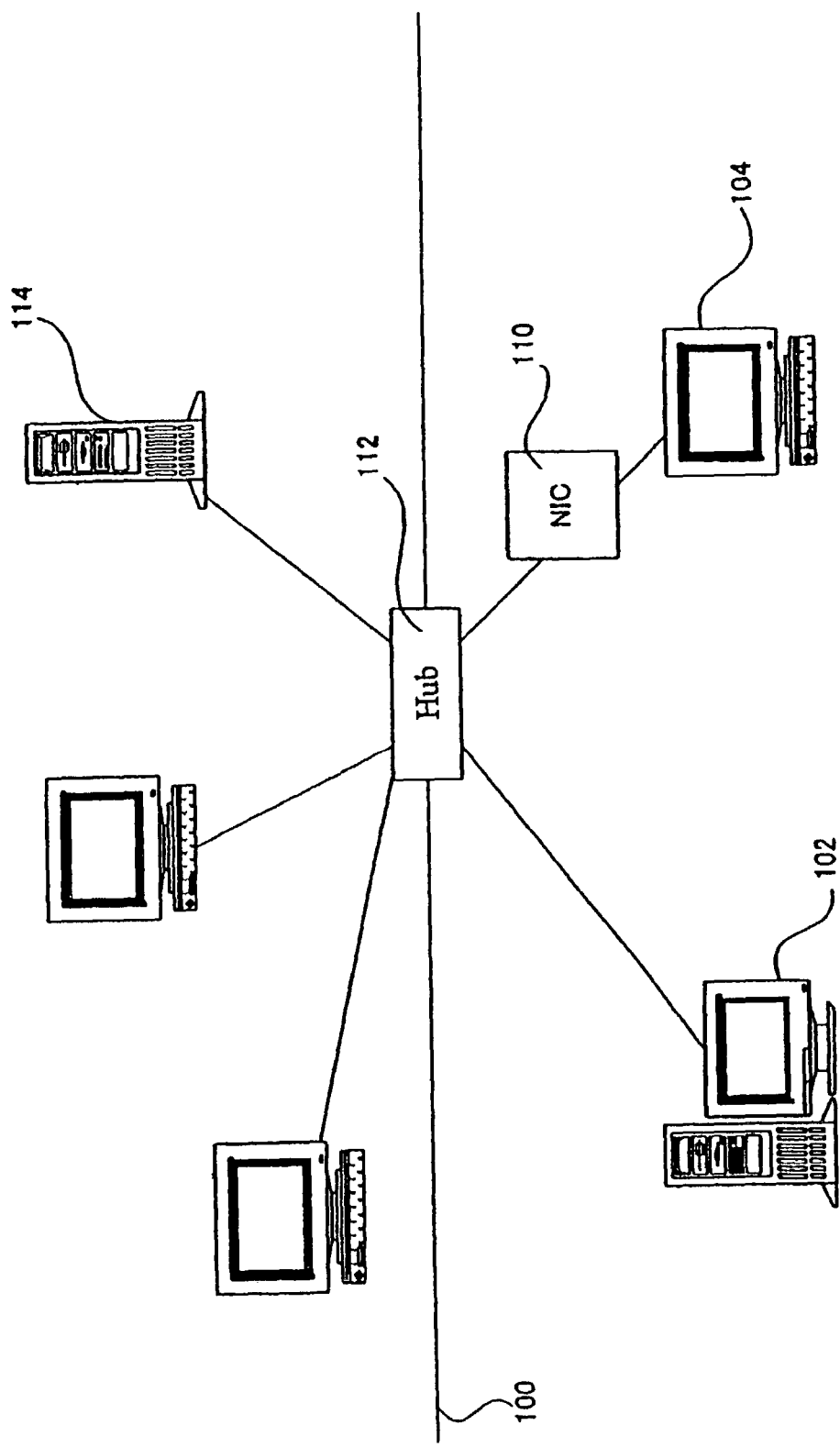
FIG. 16 is a schematic block diagram showing a typical network system using a conventional DHCP server.

FIG. 14 is a block diagram showing an embodiment of a second network system 50 according to the invention. The illustrated network system 50 includes a server system 52 and a plurality of client computers 54, 56. The depicted server system 52 includes a plurality of appliance servers 52a-d that are cluster nodes. Also, the server system 52 and the clients 54, 56 are connected to a service network 58 in which the services provided by the server system 50 are available to the clients 54, 56. The appliance servers 52a-d are connected also to a management network 60 to manage the appliance servers 52ad. In the depicted embodiment, the management network 60 is configured separately from the service network 58.

In the illustrated network system 50, the invention may be applied to each of the appliance servers 52a-d connected to the management network 60. In one embodiment, when one of the appliance servers 52a-d is initially connected or reconnected to the management network 60, the IP addresses assigned to other appliance servers already connected to the management network 60 may be automatically acquired and the assigned IP address may be automatically set up, in a similar manner to that described above.

Also, in this embodiment of the invention, the appliance server may store a previously assigned IP address such that the same IP address can be automatically assigned again unless there is an assignment conflict. Therefore, the IP address of each of the appliance servers 52a-d can be substantially fixed and the server system 52 in general may be enhanced in the maintenance capability and the network availability. Also, this invention in one embodiment may be applicable to a built-in apparatus comprising built-in software and providing a variety of services to a user with the IP address, in addition to the appliance servers.

In one embodiment of the invention, the program for performing each procedure as described above may be described in an object oriented program language, for example, C++ language. In an further embodiment, the program of the invention may be stored in a computer readable recording medium, such as a floppy disk, CD-ROM, DVD, CD-RW, an optical magnetic disk, a hard disk, and a magnetic tape. Also, it may be configured in a transmission medium distributed on the network.

While the present invention has been described above using the specific embodiments with reference to the accompanying drawings, the invention is not limited to those specific embodiments. It will be apparent to those skilled in the art that various changes or modifications may be made to the embodiments of the invention, and other embodiments may be adopted.

What is claimed is:

1. An apparatus for assigning a first IP address to a first informational processing device connected to a network, the first informational processing device comprising the apparatus and configured as a client, the apparatus comprising:

a network interface card electronically connecting the first informational processing device to the network and allowing communication over the network;

a computer readable recording medium storing a program;

a Central Processing Unit (CPU) coupled to the network interface card and executing the program, the program comprising:

an IP setting module receiving a range of IP addresses allocated to the network, storing the range of IP addresses allocated to the network on the first informational processing device, sending IP address request data packet over the network requesting a second IP address assigned to a second informational processing device connected to the network, operating in an address setting mode for a specific time-out period after the IP address request data packet has been send over the network, the time-out period is sufficient to receive response from the second informational processing device, receiving the second IP address from the second informational processing device, creating an IP address table, the IP address table comprising a computer identifier corresponding to a currently assigned the received second IP address of the second each responding informational processing device, wherein the computer identifier comprises an identification number assigned to the second informational processing device, which is usable to identify the second informational processing device on the network, and assigning an unassigned first IP address to the first informational processing device from range of IP addresses allocated to the network upon expiration of the specific time-out period, wherein the unassigned first IP address is distinct from the second IP address of the second informational processing device, updating the IP address table to contain the computer identifier and the unassigned first IP address of the first informational processing device;

an IP address notification module communicating the unassigned first IP address over the network in response to assigning the unassigned first IP address to the first informational processing device, wherein communicating the unassigned first IP address over the network comprising transmitting an IP address notification data packet using UDP.

2. The apparatus of claim 1, the IP address setting module further receiving the second IP address via the network interface card from a transmission originating from the second informational processing device and storing the second IP address in an electronic storage device coupled to the network interface card.

3. The apparatus of claim 1, the IP address setting module further assigning a previously assigned IP address as the first IP address, wherein the previously assigned IP address comprises an IP address previously assigned to the first informational processing device.

4. The apparatus of claim 1, the IP address notification module further assigning an IP address specified by a user as the first IP address.

5. The apparatus of claim 1, wherein the request for the second IP address is communicated with an originator address of 0.0.0.0.

6. The apparatus of claim 5, wherein the second informational processing device sends an IP address notification data packet comprising the second IP address after a random time delay that is less than the specified time-out period.

7. A network system for assigning a first IP address to a first informational processing device, the system comprising:
a first informational processing device connected to a network as a client;
a plurality of additional informational processing device connected to the network, each of the additional information processing devices having a corresponding IP address and the network having allocated IP addresses comprising the corresponding IP addresses;
the first informational processing device receiving a range of IP addresses allocated to the network, storing the range of IP addresses allocated to the network on the first informational processing device, broadcasting one request over the network for the IP addresses from the plurality of additional informational processing devices, operating in an address setting mode for a specified time-out period after the broadcasting has been send over the network, the time-out period is sufficient to receive responses from the additional informational processing devices, receiving IP addresses from the plurality of additional informational processing devices, creating an IP address table, the IP address table comprising a computer identifier corresponding to the IP address received from each of the plurality of additional informational processing devices responses to the broadcasting a currently assigned IP address for each responding informational processing device, wherein the computer identifier comprises an identification number assigned to each of the plurality of additional informational processing device, which is usable to identify each of the plurality of additional informational processing device on the network, assigning an unassigned first IP address to the first informational processing device from the range of IP addresses allocated to the network upon expiration of the specified time-out period, wherein the unassigned first IP address is distinct from the IP addresses of the plurality of additional informational processing devices, updating the IP address table to contain the computer identifier and the unassigned first IP address of the first informational processing device; and communicating the unassigned first IP address over the network in response to assigning the unassigned first IP address to the first informational device, wherein communicating the unassigned first IP address over the network comprising transmitting an IP address notification data packet using UDP.

8. The network system of claim 7, wherein the one request for IP addresses is broadcast to each additional informational processing device in communication with the network with an originator address of 0.0.0.0 and the plurality of additional information processing devices each sends an IP address notification data packet comprising the an IP address after a random time delay that is less than the specified time-out period.

9. A method for assigning an IP address to a first informational processing device connected to a network as a client, the method comprising:
receiving a range of IP addresses allocated to the network at the first informational processing device;
storing the range of IP addresses allocated to the network on the first informational processing device;
the first informational processing device sends an IP address request data packet over the network requesting a second IP address assigned to a second informational processing device connected to the network;
the first informational processing device operates in an address setting mode for a specific time-out period after the IP address request data packet has been send over the network, the time-out period is sufficient to receive response from the second informational processing device;
the first informational processing device receives the second IP address from the second informational processing device, creates an IP address table, the IP address table comprising a computer identifier corresponding the received second IP address of the second informational processing device, wherein the computer identifier comprises an identification number assigned to the second informational processing device, which is usable to identify the second informational processing device on the network, and assigning an unassigned first IP address to the first informational processing device from range of IP addresses allocated to the network upon expiration of the specific time-out period, wherein the unassigned first IP address is distinct from the second IP address of the second informational processing device, updating the IP address table to contain the computer identifier and the unassigned first IP address of the first informational processing device;
the first informational processing device communicates the unassigned first IP address over the network in response to assigning the unassigned first IP address to the first informational processing device, wherein communicating the unassigned first IP address over the network comprising transmitting an IP address notification data packet using UDP.

10. The method of claim 9, further comprising assigning a previously assigned IP address as the first IP address, wherein the previously assigned IP address comprising an IP address previously assigned to the first informational processing device.

11. The method of claim 9, further comprising assigning an IP address specified by a user as the first IP address.

12. The method of claim 9, further comprising operating the first informational processing device in an IP notification mode.

13. The method of claim 9, wherein the first informational processing device sends the IP address request data packet for second IP address assigned to a second informational processing device in communication with the network with an originator address of 0.0.0.0.

14. The method of claim 9, wherein the second informational processing device sends an IP address notification data packet comprising the second IP address after a random time delay that is less than the specified time-out period.

15. A computer readable recording medium containing computer readable code configured to carry out a method for assigning an IP address to a first informational processing device connected to a network a client, the method comprising:
 receiving a range of IP addresses allocated to the network at the first informational processing device;
 storing the range of IP addresses allocated to the network on the first informational processing device;
 sending an IP address request data packet over the network requesting a second IP address assigned to a second informational processing device connected to the network;
 operating in an address setting mode for a specific time-out period after the IP address request data packet has been send over the network, the time-out period is sufficient to receive response from the second informational processing device;
 receiving the second IP address from the second informational processing device, creates an IP address table, the IP address table comprising a computer identifier corresponding the received second IP address of the second informational processing device, wherein the computer identifier comprises an identification number assigned to the second informational processing device, which is usable to identify the second informational processing device on the network, and assigning an unassigned first IP address to the first informational processing device from range of IP addresses allocated to the network upon expiration of the specific time-out period, wherein the unassigned first IP address is distinct from the second IP address of the second informational processing device, updating the IP address table to contain the computer identifier and the unassigned first IP address of the first informational processing device;
 communicating the unassigned first IP address over the network in response to assigning the unassigned first IP address to the first informational processing device, wherein communicating the unassigned first IP address over the network comprising transmitting an IP address notification data packet using UDP.

16. The computer readable recording medium of claim 15, containing computer readable code configured to assign a previously assigned IP address as the first IP address, wherein the previously assigned IP address comprising an IP address previously assigned to the first informational processing device.

17. The computer readable recording medium of claim 15, containing computer readable code configured to assign an IP address specified by a user as the first IP address.

18. The computer readable recording medium of claim 15, containing computer readable code configured to send the IP address request data packet for second IP address assigned to a second informational processing device in communication with the network with an originator address of 0.0.0.0 and the second information processing device sends an IP address notification data packet comprising the an IP address after a random time delay that is less than the specified time-out period.

19. An apparatus for assigning a first IP address to a first informational processing device connected to a network, the first informational processing device comprising the apparatus and configured as a client, the apparatus comprising:
 a memory;
 a Central Processing Unit (CPU);
 means for receiving a range of IP addresses allocated to the network at the first informational processing device;
 means for storing the range of IP addresses allocated to the network on the first informational processing device;
 means for sending an IP address request data packet over the network requesting a second IP address assigned to a second informational processing device connected to the network;
 means for operating in an address setting mode for a specific time-out period after the IP address request data packet has been send over the network, the time-out period is sufficient to receive response from the second informational processing device;
 means for receiving the second IP address from the second informational processing device;
 means for creating an IP address table, the IP address table comprising a computer identifier corresponding the received second IP address of the second informational processing device, wherein the computer identifier comprises an identification number assigned to the second informational processing device, which is usable to identify the second informational processing device on the network;
 means for assigning an unassigned first IP address to the first informational processing device from range of IP addresses allocated to the network upon expiration of the specific time-out period, wherein the unassigned first IP address is distinct from the second IP address of the second informational processing device;
 means for updating the IP address table to contain the computer identifier and the unassigned first IP address of the first informational processing device;
 means for communicating the unassigned first IP address over the network in response to assigning the unassigned first IP address to the first informational processing device, wherein communicating the unassigned first IP address over the network comprising transmitting an IP address notification data packet using UDP.

20. The apparatus of claim 19, wherein sending the IP address request data packet for second IP address assigned to a second informational processing device in communication with the network with an originator address of 0.0.0.0 and the second information processing device sends an IP address notification data packet comprising the an IP address after a random time delay that is less than the specified time-out period.

* * * * *